(12) United States Patent
Goel

(10) Patent No.: US 8,560,865 B2
(45) Date of Patent: Oct. 15, 2013

(54) CABLE WITH MEMORY

(76) Inventor: Anil Goel, London (GB)

( * ) Notice: Subject to any disclaimer, the term of this patent is extended or adjusted under 35 U.S.C. 154(b) by 636 days.

(21) Appl. No.: 12/740,657

(22) PCT Filed: Oct. 29, 2008

(86) PCT No.: PCT/EP2008/064655
§ 371 (c)(1),
(2), (4) Date: Apr. 29, 2010

(87) PCT Pub. No.: WO2009/056559
PCT Pub. Date: May 7, 2009

(65) Prior Publication Data
US 2010/0262845 A1    Oct. 14, 2010

(30) Foreign Application Priority Data

Oct. 30, 2007  (DK) .................................. 2007 01547
Feb. 5, 2008   (DK) .................................. 2008 00157

(51) Int. Cl.
*G06F 1/26*     (2006.01)
*G06F 3/00*     (2006.01)

(52) U.S. Cl.
USPC ........................................... 713/300; 710/20

(58) Field of Classification Search
None
See application file for complete search history.

(56) References Cited

U.S. PATENT DOCUMENTS

| 8,166,558 B2 * | 4/2012 | Meijer et al. ................... 726/27 |
| 2003/0098670 A1 | 5/2003 | Kobayashi |
| 2006/0041778 A1 * | 2/2006 | Lizzi et al. ........................ 714/4 |
| 2006/0158154 A1 | 7/2006 | Maurilus |

FOREIGN PATENT DOCUMENTS

| EP | 1085400 A | 3/2001 |
| EP | 1158406 A | 11/2001 |
| EP | 1583199 A | 5/2005 |
| JP | 2004032480 A | 1/2004 |
| JP | 2005057311 A | 3/2005 |

OTHER PUBLICATIONS

International Preliminary Report on Patentability.
International Search Report, Mar. 3, 2009.
"Office Action Dated Nov. 11, 2010; European Patent Application No. 08844244.7".
"Office Action Dated Oct. 7, 2008; Danish Patent Application No. PA200800157".
"Office Action Dated Aug. 2, 2013; European Patent Application No. 08844244.7", (Aug. 2, 2013).

* cited by examiner

*Primary Examiner* — Dennis M Butler
(74) *Attorney, Agent, or Firm* — Blakely Sokoloff Taylor & Zafman LLP

(57) ABSTRACT

A cable for providing electric power from a power source to a mobile device, the cable having a first connector at a first end of the cable for connecting the cable to a mobile device and with a second connector at a second end for connecting the cable to the power source, wherein the cable comprises a memory module for backup and bidirectional transfer of data to and from the mobile device.

20 Claims, 2 Drawing Sheets

CABLE WITH MEMORY

FIELD OF THE INVENTION

Figure 1:
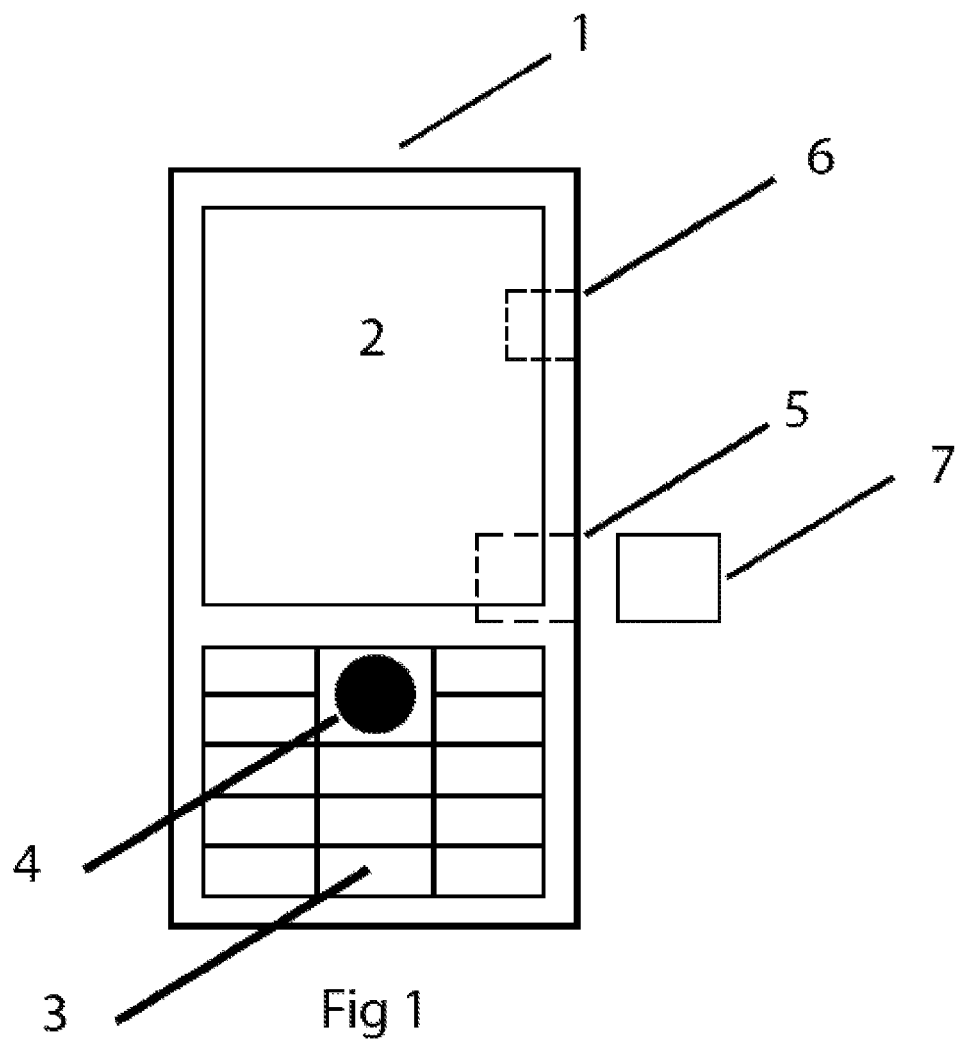

The present invention relates to backup and bidirectional transfer of data to and from a mobile device, for example a mobile phone.

BACKGROUND OF THE INVENTION

When a mobile device (for example a mobile phone) is lost, typically a large amount of personal data is lost, because the user has not backed-up the data from the mobile device. Backup of data usually requires a connection to a computer, for example personal computer or a remote server, and regular conscious time and efforts on the part of the user. However, many users of mobile devices do not have ready and easy access to a computer at all times, which prevents them from regular and frequent backup of data. In addition, many users not only forget but also have no time for regular and frequent back up of data.

US patent application No. 2003/0098670 by Kobayashi discloses a telephone charger with a data backup function of reading out various data stored in the memory inside the cellular phone and storing them and a re-storing function of writing various backup data to the memory inside the cellular phone. The telephone charger is connected to the phone, either directly or by a cable. The charger is powered either from a home power socket or from dry cell. US patent application No. 2006/0158154 by Maurilus discloses a telephone charger with backup memory. Once the telephone is coupled to the charger, the data from the primary memory is backed up to the backup memory. European patent application EP 1 583 199 by Osaka discloses a desktop holder for a cell phone, the desktop having a charging and a data backup function. The desktop These systems have the disadvantage for the user that a backup is only possible, if the charger is present. As the charger is bulky, it is unlikely that the user will have the charger at hand, unless the user is at home or at the office, where the charger, typically, is stored.

It is desirable to provide a user-friendly system for backup and bidirectional transfer of data to and from a mobile device, where the system is not only easy to transport but also applicable even when phone is charged via other power sources e.g. computer, car charger etc.

OBJECT OF THE INVENTION

It is an object of the invention to provide a user-friendly system for backup and bidirectional transfer of data to and from a mobile device, which is easy to transport and applicable when phone is charged via through other power sources.

DESCRIPTION OF THE INVENTION

This object is achieved with a cable for providing electric power from a power source, for example a USB charger, computer etc, to an electronic mobile device, the cable having a first connector at a first end of the cable for connecting the cable to the mobile device and having a second connector at a second end for connecting the cable to the power source wherein the cable comprises a memory module for backup and bidirectional transfer of data to and from the mobile device.

As the cable does not include a charger, desktop holder and power supply, it is much more user friendly and easy to transport than prior art systems. The backup memory module can be made very small and light weight, such that the cable can easily be transported in a pocket.

In a preferred solution, the first end is a part of a first cable part and the second end is a part of a second cable part, wherein both cable parts are fastened directly and irremovably to the memory module. The term irremovably implies that a removal of the cable parts from the memory module destroys the cable and the memory module.

The memory of the memory module may be irremovably integrated in the memory module. The term "irremovable integrated" is to be understood such that the memory module is damaged if the memory is removed form the module. However, preferably, the memory of the memory module is removable. Optionally, the memory module comprises a microcontroller, however, this is not necessary in a variety of applications, as it will appear from the following.

In a practical embodiment, the memory module comprises a digital data bus and a memory card interface. Preferably, the memory card interface comprises a receptacle for a removable memory card, for example the receptacle is a slot for a flash memory card.

In addition, the memory module may comprise a USB interface, i.e. a receptacle for USB flash drive.

In a practical embodiment, the cable is an USB cable and the first connector is a USB connector (or its variants including USB OTG) and the second connector is USB connectors. Alternatively, the first connector is a Proprietary connector and the second connector is a USB connector.

Such a cable can advantageously be connected to a mobile device and a power source such as a USB charger, computer etc. for backup and bidirectional transfer of data to and from the mobile device simultaneously with charging operation of the mobile device.

In the case where the mobile device, for example telephone, does not have a charging port that also functions as a data port, that end of the cable that connects to the mobile device divides/bufircates into two connectors, where one connector is used for trans-port of data into the data port of the mobile device (for example micro USB or its variants including USB OTG or proprietary connector) and another connector is connected to the charging port, for example as a standard charging connector or as a proprietary charging connector for the mobile device.

In preferred embodiments, the mobile device acts as a master and the memory module acts as a slave. In other words, the mobile device controls the transfer of the data both from the mobile device to the memory module and from the memory module to the mobile device.

For example, the mobile device is configured for requesting a user command for initiating and transferring all the user data or selected user data from the mobile device to the memory module.

Alternatively, the mobile device is configured for automatic back-up of all the user data from the mobile device to the memory module as a response to a connection of the cable to the mobile device and, optionally, to the power source for charging the mobile device.

In the situation, where the memory module acts as a slave, a microcontroller is not strictly necessary in the memory module. If the memory module is microcontroller-free, the production costs are lower, which production-wise is simpler and may be an advantage commercially due to the lower costs.

In other embodiments, the memory module comprises a microcontroller, and acts as a master and the mobile device acts as a slave. In other words, the memory module controls the transfer of the data both from the mobile device to the memory module and from the memory module to the mobile device.

For example, the memory module with the microcontroller is configured for receiving a user command for initiating reading and transferring all data or selected data from a memory card or a USB flash drive of the memory module to the mobile device.

As a further example, the memory module is configured for initiating automatic back-up of all the user data from the mobile device to the memory module as a response to a connection of the cable to the mobile device and, optionally, to the power source for charging the mobile device.

The cable may be configured to act automatically as a standard USB cable after backup (automatic) or restore/ switch function or on user command via a toggle switch on the memory module any time.

In cases, where the mobile device, for example cell phone, does not have a corresponding program installed for backup facility, the cable with the memory module may advantageously be configured for acting as a standard USB cable, for example by setting the backup function into a sleep mode after a check for a corresponding program in the mobile device.

Preferably, the mobile device has a removable memory card for storage of data, and the cable has a memory module with a removable memory card, preferably, of the same type as the memory card of the mobile device.

In a further embodiment, the mobile device is configured for automatically storing all the user data on the removable memory card inside the mobile device and for holding the internal memory of the mobile device free from any user data.

Optionally, the mobile device is configured for automatically creating a default directory and file structure on the removable memory card inside the mobile device as part of the start procedure after insertion of a new memory card into the mobile device.

SHORT DESCRIPTION OF THE DRAWINGS

Figure 2:
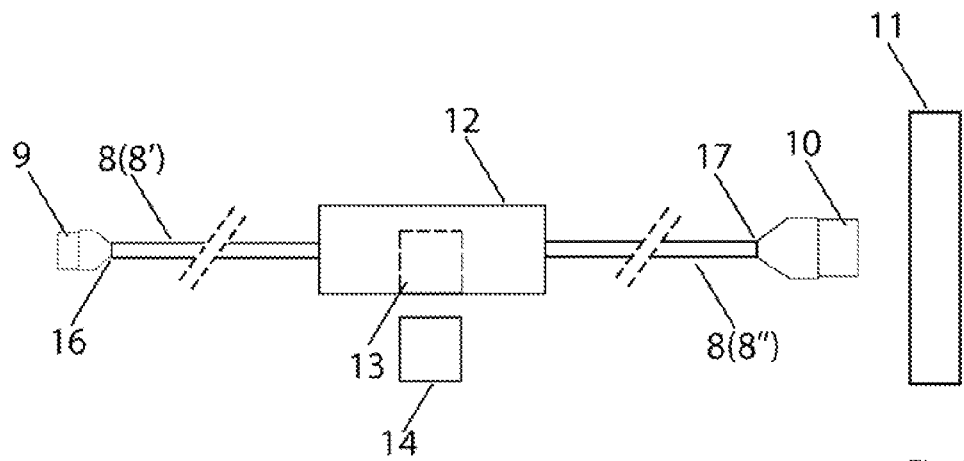
Figure 3:
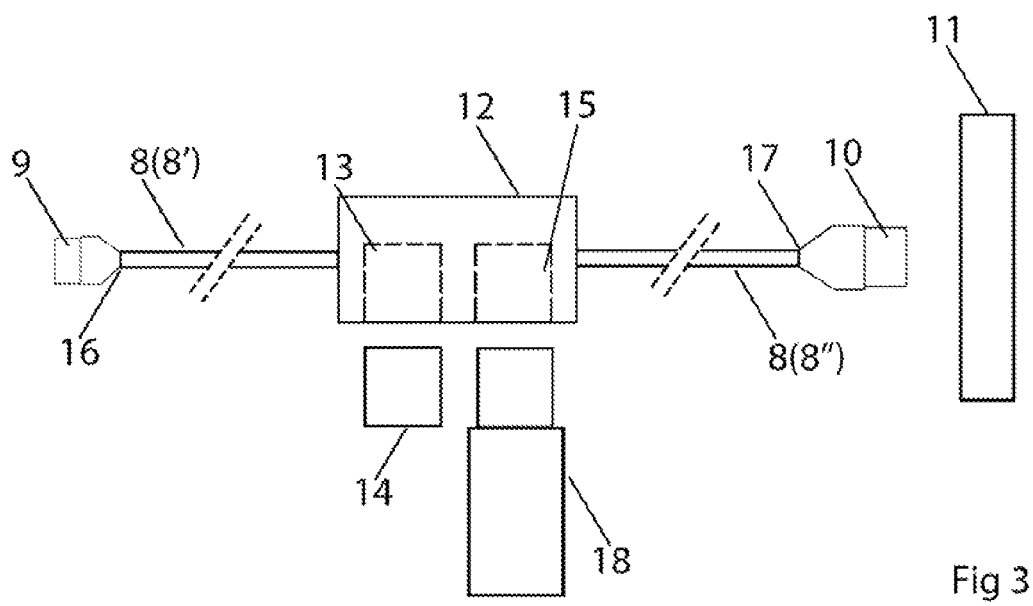

The invention will be described in more detail with reference to the drawing, where
FIG. 1 shows an example of a mobile device,
FIG. 2 shows a first embodiment of the invention, and
FIG. 3 shows a second embodiment of the invention.

DETAILED DESCRIPTION OF THE INVENTION

FIG. 1 shows a mobile device 1, for example a mobile phone or PDA. The mobile device 1 has a display screen 2 and a keypad 3 with a navigation button 4. In addition, it has a first interface 5 for a memory card, for example a micro SD or mini SD, a second interface 6 for a micro USB, mini USB, USB OTG or other Proprietary interface.

The mobile device 1 is configured for automatically storing all user data on the removable memory card 7 inside the mobile device such that the internal memory in the mobile device is not used for storing any user data.

Alternatively, the internal memory is used for storing user data, but all these data are also stored on the memory card.

The mobile device, under user command and control, writes a default directory and file structure to the removable memory card 7 as part of the start procedure after insertion of a new memory card 7 into the mobile device 1.

FIG. 2 shows the cable 8 having a first connector 9 at a first end 16 of the cable 8, the first connector being a micro USB or mini USB or USB OTG or Proprietary connector for plugging into the mobile device interface 6. The cable 8 has a second connector 10 at a second end 17, preferably being a USB connector 10 for plugging into a power source 11, for example, a charger or a computer. Furthermore, the cable has a memory module 12 between the connectors 9 and 10. The memory module 12 has a memory card interface 13, preferably, a micro SD or mini SD card interface, used for receiving a memory card 14, preferably, a micro SD or mini SD card.

FIG. 3 shows an alternative embodiment of the cable 8 having
1) Micro USB or Mini USB or USB OTG or Proprietary connector 9 to plug into Mobile device interface 1
2) USB connector 10 to plug into power source 11 (for example a charger or a computer)
3) Memory module 12
4) Micro SD or Mini SD or other memory card interface 13
5) Micro SD or Mini SD or other memory card 14
6) USB interface 15
7) USB flash drive 18

As it shown in the FIG. 2 and FIG. 3, the first end 16 is part of a first cable part 8' and the second end 17 is part of a second cable part 8", wherein both cable parts 8', 8" are fastened directly and irremovably to the memory module 12 such that the memory module—thus, being integral part of the cable—cannot be detached or removed from the cable 8 without destroying the cable 8 and the memory module 12.

The invention also includes an alternative solution, wherein the memory module 12 may itself be provided with connectors, such as USB (or its variants including USB OTG) connectors, so that it can be connected with one USB cable or USB-like cable (Propriety connector at one end and USB connector at other) to the mobile device and with another USB cable to the power source. The memory module works then as a backup memory for the mobile device but is transparent with regard to the power provision from the power source to the mobile device. Such a module may also have a memory card receptacle for a removable memory card and may have a USB Flash drive interface. Alternatively, the memory in the memory module is irremovable from the memory module. As an option, the memory module may comprise a microcontroller in addition.

In all the above embodiments, the memory module is powered either from the mobile device or the power source.

The mobile device acts as a master and the memory module acts as a slave in various operating modes.

Operating Mode 1

The mobile device 1, under user command and control, initiates and transfers the all the user data from the memory card 7 of the mobile device 1 to the memory module 12 over the interface 6 and the connector 9. All the user data can be backed-up, under user command and control, to either the memory card 14 or the USB flash drive 19 of the memory module 12, as illustrated in the FIG. 3 embodiment. A power connection may or may not be required for this mode of operation.

In addition or alternatively, the mobile device 1 may be configured for automatically backing-up all the user data from the memory card 7 of the mobile device 1 to the memory card 14 of the memory module as a response to a connection of the cable 8 to the mobile device 1 and, optionally, to the power source 11 for charging the mobile device 1.

Further, in this mode, selected data from the memory card 7 of the mobile device 1, under user command and control, can either be copied or appended to the data either on the memory card 14 or the USB flash drive 18 of the memory module 12. The data on the memory card 14 or the USB flash drive 18 of the memory module 12 may have been obtained from other sources such as a computer or another mobile device. A power connection may or may not be required for this mode of operation.

Operating Mode 2

The mobile device, under user command and control, reads and transfers the selected data either from the memory card 14 or the USB flash drive 18 of the memory module 12 to the mobile device 1 by mastering the memory module 12 over the interface 6 and connector 9. The selected data can be either copied or appended, under user command and control, to the data on the memory card 7 of the mobile device 1. The data on the memory card 14 or the USB flash drive 18 of the memory module 12 may have been obtained from other sources such as a computer or another mobile device. A power connection may or may not be required for this mode of operation.

Alternatively, the memory module 12 comprises a microcontroller and acts as a master and the mobile device 1 acts as a slave in various operating modes.

Situation 1

Mobile device users depend on the mobile device 1, such as a mobile phone, to the extent that they do not even remember the phone numbers of their close family and friends whom they call regularly, not to mention other people in their phone book.

Many times, users get caught unguarded when outside whereby their mobile device battery dies because either they have forgotten to charge the phone or they have used it extensively. In such a situation, they find themselves disconnected/stranded. They can neither call/connect to people they were supposed to or want to as they don't generally remember their phone numbers or nor other people can call/connect to them as the mobile device has no battery.

Generally, Users don't carry the charger with them. It is next to impossible to find somebody else with a charger to charge the phone and get the information they need from the mobile device.

In the above situation, according to the invention, the user can simply put the removable memory card of their mobile device into somebody else's mobile device with battery life and can get the information they need. This is so, because all user data is entirely contained in the removable memory card 7 of the mobile device 1.

Situation 2

Users change/upgrade their mobile device regularly. When they do so, they would like to transfer all their data from their existing mobile device to their new mobile device.

In the above situation, according to the invention, the user can simply put the removable memory card from their exiting mobile device to their new mobile device. This is so, because all user data is entirely contained in the removable memory card 7 of the mobile device 1. Alternatively, the user can transfer data from the memory module 12 to the new mobile device 1.

In case, the new mobile device has a different connector, the user can put the removable memory card from the memory module 12 on to the memory module of the new cable with corresponding connector and transfer data from new memory module (on the new cable) to the new mobile device.

Situation 3

As mobile devices are increasingly becoming fashion accessories, users like to have multiple mobile devices and use different mobile devices for different purposes/occasions. They would like all their latest data to be easily available on all their mobile devices.

In the above situation, according to the invention, the user can simply put the removable memory card from their mobile device that they were last using and into other mobile device which they want to use. This is so, because all user data are entirely contained in the removable memory card 7 of the mobile device 1.

In case, the mobile device user want to use has different connectors, the user can put the removable memory card from the memory module 12 on to the memory module of the new cable with corresponding connector and transfer data from new memory module (on the new cable) to the mobile device user want to use.

Situation 4

Mobile devices are often bent or dropped on the floor or into water. These may result of a mechanical or electrical failure of the mobile device. At times these faults are unrepairable or more expensive to repair than to replace the mobile device.

In the above situation, according to the invention, the user can simply put the removable memory card from their existing mobile device (damaged) to their new mobile device. In case that the memory card also has been damaged, the user can use the removable memory card from the memory module 12 of cable 8. Alternatively, the user can transfer data from the memory module 12 to the new mobile device 1.

In case, the new mobile device has different connector, the user can put the removable memory card from the memory module 12 on to the memory module of the new cable with corresponding connector and transfer data from new memory module (on the new cable) to the new mobile device.

Situation 5

Mobile devices, for example mobile telephones, are often lost or get stolen. Regardless of how a mobile device goes missing, this not only means the loss of the mobile device itself, but also the loss of all the user information in the mobile device. In many instances, the loss of this information may be more difficult to replace than the loss of the mobile device itself. It may even be impossible to replace the lost information.

In the above situation, according to the invention, the user can simply put the memory card 14 from the memory module 12 of cable 8 into their new mobile device 1. Alternatively, the user can transfer data from memory module 12 to the new mobile device 1.

In case, the new mobile device has different connector, the user can put the removable memory card from the memory module 12 on to the memory module of the new cable with corresponding connector and transfer data from new memory module (on the new cable) to the new mobile device.

Situation 6

Sometimes user deletes/looses certain information due to mistakes or erroneous operation.

In the above situation, according to the invention, the user can simply swap the removable memory card 7 of the mobile device 1 and that memory card 14 of the memory module 12. Alternatively, the user can transfer the lost data from the memory module 12 to the mobile device 1.

The invention claimed is:

1. A cable (8) for providing electric power from a power source (11) to an electronic mobile device (1), the cable (8) not including a charger or other type of power supply and having a first connector (9) at a first end (16) of the cable (8) for connecting the cable (8) to the mobile device (1) and having a second connector (10) at a second end (17) for connecting the cable (8) to the power source (11), wherein the cable (8) comprises a memory module (12) between the first (16) and the second (17) end for backup and bidirectional transfer of data to and from the mobile device (1), wherein the first connector is a Proprietary connector and the second connector is a USB connector; or wherein the cable is an USB cable and the first connector is a USB connector or its variants including USB OTG and the second connector is a USB connector;

wherein the first end (16) is part of a first cable part (8') and the second end 17 is part of a second cable part (8"), wherein both cable parts (8', 8") are fastened directly and irremovably to the memory module (12);

wherein the memory module comprises a digital data bus and a memory card interface in the form of a receptacle for a removable memory card; and wherein the memory module comprises a USB interface for a USB flash drive.

2. A cable according to claim 1, wherein the USB interface is a receptacle for a USB flash drive.

3. A cable according to claim 1, wherein the cable towards the first end divides into a USB connector or its variants including USB OTG or Proprietary connector for the data transfer when connected to a data port of the mobile device and a separate charging connector for connection to a charging port of the mobile device.

4. A cable according to claim 1, wherein the memory module is powered from the mobile device.

5. A cable according to claim 1, wherein the memory module is powered from the power source.

6. A cable according to claim 1 in combination with mobile device, wherein the mobile device (1) is configured for acting as a master and the memory module (12) for acting as a slave in various operating modes.

7. A cable according to claim 1 in combination with mobile device (1), wherein the memory module (12) comprises a microcontroller configured for acting as a master with the mobile device acting as a slave in various operating modes.

8. A combination according to claim 7, wherein the master is configured for receiving a user command for initiating and transferring all the user data from the mobile device (1) to the memory module (12).

9. A combination according to claim 7, wherein the master is configured for requesting a user command for initiating and transferring all the user data from the mobile device (1) to the memory module (12).

10. A combination according to claim 6, wherein the master is configured for automatically initiating back-up of all the user data from the mobile device to the memory module (12) as a response to a connection of the cable (8) to the mobile device (1).

11. A combination according to claim 6, wherein the master is configured for receiving a user command for selecting data and for initiating and transferring the selected data either from the mobile device (1) to the memory module (12) or from the memory module (12) to the mobile device (1).

12. A combination according to claim 6, wherein the mobile device has memory card (7) inside the mobile device (1) for storage of data, and wherein the cable (8) has a memory module (12) with a memory card (14) of the same type as the memory card (7) of the mobile device (1).

13. A combination according to claim 6, wherein the mobile device is configured for automatically storing all user data on the memory card (14) inside the mobile device and for holding the internal memory of the mobile device free from any user data.

14. A combination according to claim 6, wherein the mobile device is configured for receiving a user command for creating a default directory and file structure on a removable memory card inside the mobile device as part of the start procedure after insertion of a new memory card into the mobile device.

15. A combination according to claim 6, wherein the master is configured for receiving a user command for initiating an transferring all the user data from the mobile device (1) to the memory module (12).

16. A combination according to claim 7, wherein the master is configured for automatically initiating back-up of all the user data from the mobile device to the memory module (12) as a response to a connection of the cable (8) to the mobile device (1).

17. A combination according to claim 7, wherein the master is configured for receiving a user command for selecting data and for initiating and transferring the selected data either from the mobile device (1) to the memory module (12) or from the memory module (12) to the mobile device (1).

18. A combination according to claim 7, wherein the mobile device has memory card (7) inside the mobile device (1) for storage of data, and wherein the cable (8) has a memory module (12) with a memory card (14) of the same type as the memory card (7) of the mobile device (1).

19. A combination according to claim 7, wherein the mobile device is configured for automatically storing all user data on the memory card (14) inside the mobile device and for holding the internal memory of the mobile device free from any user data.

20. A combination according to claim 7, wherein the mobile device is configured for receiving a user command for creating a default directory and file structure on a removable memory card inside the mobile device as part of the start procedure after insertion of a new memory card into the mobile device.

\* \* \* \* \*